(12) United States Patent
Kuklinski

(10) Patent No.: US 7,123,544 B1
(45) Date of Patent: Oct. 17, 2006

(54) ASSEMBLY AND METHOD FOR DETERMINING SPEED OF A SUPERCAVITATING UNDERWATER VEHICLE

(75) Inventor: Robert Kuklinski, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 282 days.

(21) Appl. No.: 10/857,374

(22) Filed: May 24, 2004

(51) Int. Cl.
*G01S 15/60* (2006.01)
(52) U.S. Cl. ............................................. 367/89
(58) Field of Classification Search ............... 367/89
See application file for complete search history.

(56) References Cited

U.S. PATENT DOCUMENTS

| | | |
|---|---|---|
| 4,506,353 A | 3/1985 | Rott et al. |
| 5,224,075 A | 6/1993 | Iino et al. |
| 5,371,718 A | 12/1994 | Ikeda et al. |
| 5,475,620 A | 12/1995 | Kuzuya et al. |
| 5,827,958 A | 10/1998 | Sigler |
| 6,314,053 B1 | 11/2001 | Doisy et al. |

OTHER PUBLICATIONS

Kuklinski et al.; Experimental Study of Ventilated Cavities on Dynamic Test Model; 2001; pp. 1-8.*

* cited by examiner

*Primary Examiner*—Dan Pihulic
(74) *Attorney, Agent, or Firm*—Jean-Paul A. Nasser; James M. Kasischke; Michael P. Stanley

(57) ABSTRACT

An assembly for determining speed of a supercavitating underwater vehicle during underwater travel includes a fin mounted on the vehicle aft of a cavitator portion of the vehicle and adapted to be extended outwardly beyond a hull of the vehicle and through a boundary of a gas-filled cavity around the vehicle to form a disturbance in the cavity boundary, which disturbance propagates along the boundary. An acoustic transmitter is mounted on the vehicle and directs acoustic energy toward the boundary and the disturbance. An acoustic receiver is mounted on the vehicle and receives acoustic energy reflected off the disturbance. An autopilot is mounted on the vehicle and clocks times of projection of the fin and acoustic transmission receptions of reflected acoustic energy to determine the speed of the vehicle through the water.

15 Claims, 4 Drawing Sheets

ASSEMBLY AND METHOD FOR DETERMINING SPEED OF A SUPERCAVITATING UNDERWATER VEHICLE

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER RELATED APPLICATIONS

Not applicable.

BACKGROUND OF THE INVENTION (1) Field of the Invention

The invention relates to high-speed underwater vehicles and is directed more particularly to supercavitating vehicles that move in a cushion of air underwater, and to an on-board assembly and method for measurement of the speed of the vehicle through a water environment.

(2) Description of the Prior Art

Recent investigations into high speed underwater vehicles have focused attention on providing vehicles that ride in a cushion of air to achieve high speeds in water. For a nominal prior art streamlined, fully wetted underwater vehicle, 70% of the overall drag is skin friction drag, the remainder is pressure or blockage drag. Supercavitation allows for much higher speeds to be sustainable by eliminating, or at least substantially reducing, skin friction drag. The conditions for supercavitation require that enough energy be put into the water to vaporize a given volume of water through which the vehicle travels. This is done by accelerating fluid over a sharp edge, usually the nose of a vehicle, such as a torpedo, so that the pressure drops below the vapor pressure of water. If the speed of the object is not fast enough to travel through the vapor cavity before the cavity collapses, artificial ventilation into the cavity can keep the cavity "open" until the object moves past. When a cavity completely encapsulates an object, by vaporous and/or vented cavitation, it is referred to as "supercavitation". The vehicle nose, or "cavitator", and aft control surfaces, are the only parts of the vehicle in constant contact with the water through which the vehicle travels. The cavity closure typically is positioned just forward of the aft control surfaces.

A supercavitating vehicle achieves high speed by minimizing the wetted contact area. The entire vehicle, with the exception of the cavitator and the aft control surfaces, is not in contact with the water through which the vehicle moves. The optimal use of this small wetted contact area presents problems with respect to cavity formation means and vehicle control systems, all of which must be disposed in this limited space. Traditional homing systems require surface space in order to function. However, in supercavitating vehicles, the use of the cavitator surface as a velocity sensor is impractical. Further, the lack of wetted contact areas means traditional methods of using dynamic fluid pressure for determining speed are not practical. In as much as supercavitating vehicle technology is in its early stages of development, a complete understanding of vehicle propulsion and hydrodynamics is insufficient to determine vehicle velocity from on-board sensing of fuel consumption, ventilation gas flow rates, and the like.

Accordingly, there is a need for a sensor assembly and method for determining the speed of a supercavitating underwater vehicle, as the vehicle travels through water. There is further a need for such an assembly as can be carried on-board the vehicle.

There is similarly a need for a method for determining the speed of the vehicle through water, using on-board sensors.

SUMMARY OF THE INVENTION

An object of the invention is, therefore, to provide a velocity sensor assembly for supercavitating underwater vehicles, which assembly can be carried on-board the vehicle.

A further object of the invention is to provide a method for determining speed of a supercavitating underwater vehicle traveling through an underwater environment.

With the above and other objects in view, a feature of the present invention is the provision of an assembly for determining speed of a supercavitating underwater vehicle during underwater travel. The assembly comprises a fin mounted on the vehicle aft of a cavitator portion of the vehicle and adapted to be extended outwardly beyond a hull of the vehicle and through a boundary of a gas-filled cavity around the vehicle to form a disturbance in the cavity boundary, which disturbance propagates along the boundary. An acoustic transmitter is mounted on the vehicle for directing acoustic energy toward the boundary and the disturbance. An acoustic receiver is mounted on the vehicle for receiving acoustic energy reflected off the disturbance, and an autopilot is mounted on the vehicle for clocking times of projection of the fin and times of receptions of reflected acoustic energy from the disturbance to determine the speed of the vehicle through the water.

In accordance with a further feature of the invention, there is provided a high-speed supercavitating underwater vehicle including an elongated hull of circular cross section, the hull having a cavitator at a forward end thereof, and means for ventilating gas to form a cavity around the hull in underwater travel. The vehicle further includes an assembly disposed in the hull for determining speed of the vehicle during the underwater travel. The assembly comprises a fin mounted on the hull aft of the cavitator and adapted to extend outwardly through a cavity boundary to form a disturbance in the cavity boundary, and sensors disposed in the hull for determining velocity of the disturbance relative to the hull as the disturbance propagates along the cavity boundary, whereby to determine the velocity of the vehicle.

In accordance with a still further feature of the invention, there is provided a method for determining speed of a supercavitating underwater vehicle through an underwater environment. The method comprises the steps of extending a fin mounted behind a cavitator at a forward end of the vehicle, such that the fin extends through a cavity boundary to form a disturbance in the cavity boundary, which disturbance propagates along the cavity boundary, and measuring the speed of the disturbance as the disturbance propagates along the cavity boundary, thereby to determine the speed of the vehicle through the water.

The above and other features of the invention, including various novel details of construction and combinations of parts and method steps, will now be more particularly described with reference to the accompanying drawings and pointed out in the claims. It will be understood that the particular assembly and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENTS

Figure 1:
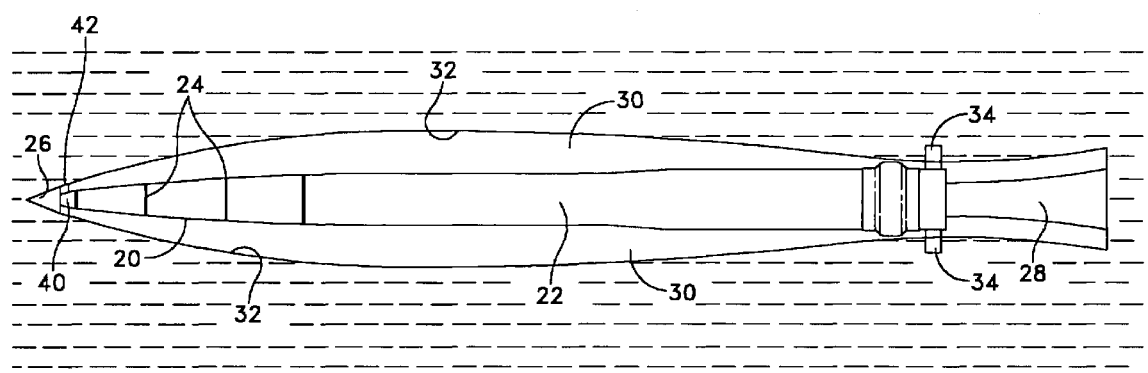
FIG. 1 is a diagrammatic side elevational view of a supercavitating vehicle traveling in an underwater environment.

Referring to FIG. 1, it will be seen that an illustrative underwater vehicle 20 includes an elongated hull 22 of circular cross section. The hull is provided with peripheral grooves or apertures 24 for venting gas, typically air, stored in the vehicle under pressure. The hull 22 is provided with a cavitator, shown herein as a pointed nose cone 26, at the forward end of the hull. The hull 22 contains a reservoir of gas (not shown) under pressure for venting through the grooves 24, and a jet engine (not shown) for propelling the hull 22 forward at a rapid rate. The aft end 28 of the hull 22 is open to accommodate a jet plume when the jet engine is in operation.

Figure 2:
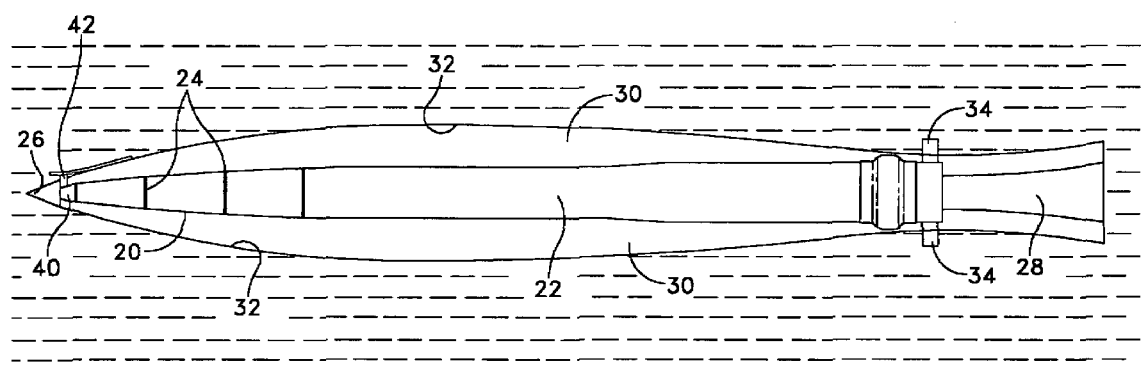
FIG. 2 is similar to FIG. 1, and further showing a portion of an assembly, and a method step, for determining speed of the vehicle.

Referring to FIG. 2, it will be seen that the forward movement of the vehicle 20 causes the nose cone 26, which acts as a cavitator, to create a cavity 30, or vapor region, behind the cone 26. The outflow of pressurized gas from the grooves 24 enlarges the cavity 30 and maintains the cavity such that the water-gas interface, or cavity boundary 32, is spaced from the vehicle 20, except at the nose cone 26 and aft end 28 of the hull 22. The vehicle 20 may be provided with fins 34 mounted on the hull 22 and adapted to extend beyond the cavity boundary 32 for purposes of stabilization and/or guidance. Thus, the vehicle 20 is not subjected to the friction of water, except at the nose cone 26 and the aft end 28 and/or control surfaces, or fins, 34.

Figure 3:
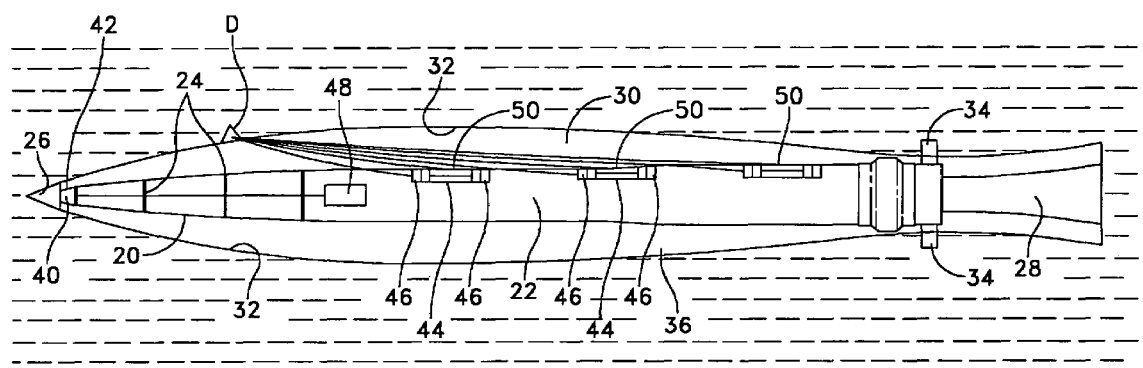
FIG. 3 is similar to FIG. 2, and further showing additional portions of the assembly, and additional method steps, for determining speed of the vehicle.

In FIGS. 1–3 there is shown a preferred embodiment of the supercavitating velocity measurement assembly. The vehicle cavitator 26 is located on a forward end of the vehicle 20. An actuator 40 is mechanically linked to a small fin 42. The fin 42 (FIG. 2) is mounted immediately downstream of the cavitator 26. The actuator 40 operates to momentarily extend the fin 42. When fully deployed, the fin 42 extends beyond the edge of the cavity 30 and impacts the cavity boundary 32. This interaction causes a disturbance D (FIG. 3) to form and propagate along the cavity boundary 32. The disruption of the cavity is local and does not contribute significantly to overall vehicle drag. A selected number of acoustic transmitters 44 (FIG. 3) send signals toward the cavity 30 and the disturbance D. The time of flight between the acoustic transmission, reflection off the disturbance D, and collection by acoustic receivers 46 is determined by a vehicle autopilot 48 that computes the pertinent times and thereby determines the speed of the vehicle, which is used to plot a homing course. The acoustic transmitters 44 and acoustic receivers 46 are linked to the vehicle autopilot 48 and to the fin actuator 40. The autopilot 48 sends commands to the fin actuator 40 and has a synchronous clock to record the arrival of the disturbance D over the acoustic receivers 46. After accounting for system lags, the vehicle velocity is determined by time from fin deployment to times of acoustic measure of the disruption, divided by the appropriate length from fin 42 to the appropriate acoustic receivers 46. Vehicle accelerations are similarly determined from time lagged velocities. This requires one receiver and multiple actuations of the fin, or a single disruption and multiple measurements of that disruption at different vehicle sensor locations, or a combination thereof. The fin 42 may be deployed at any rate desired. The mechanical lag time for the fin deployment and electronic processing of the acoustic signal are small compared to the time of travel along the cavity path and an accurate velocity measurement is obtained. The measurement accuracy is roughly independent of vehicle velocity.

Figure 4:
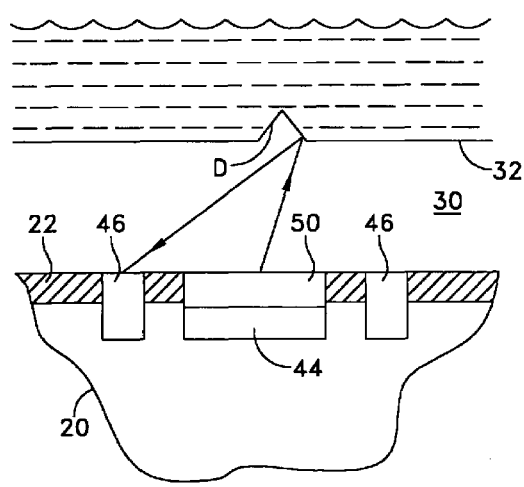
FIG. 4 is a diagrammatic illustration of portions of the assembly, and certain method steps, for determining speed of the vehicle.
Figure 5:
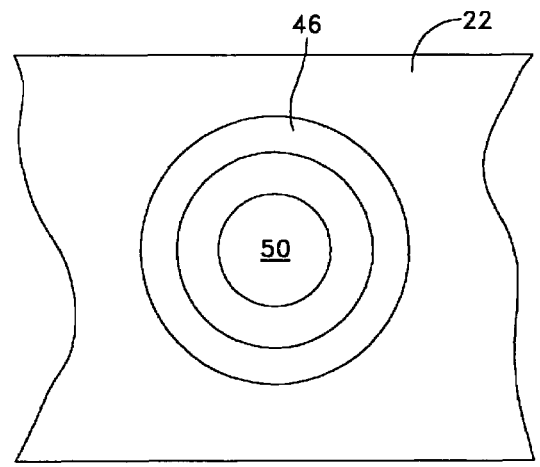
FIG. 5 is a top view of the assembly portions shown in FIG. 4.

In FIGS. 4 and 5 there are shown details of ultrasonic transmitters 44 and receivers 46. A central transmitter 44 is located beneath a transparent acoustic cover or acoustic lens 50. The acoustic energy is projected toward the cavity boundary 32. The transmission may be continuous or intermittent. In the "background" functioning of the transmission, the acoustic energy is reflected back toward the projector and dissipates. However, as a cavity disturbance D passes over the projected beam, the reflected energy is directed away from the transmitter 44. An annular receiver 46 surrounds the transmitter. The receiver 46 experiences a significant response when a cavity disruption is present. The interval between successive disruptions is timed to avoid any signal ambiguity.

There is thus provided a velocity sensor assembly for supercavitating underwater vehicles, which assembly enables on-board determination of speed by an autopilot of the vehicle.

There is further provided a method for determining the speed of a supercavitating vehicle traveling underwater. The method can be carried out by operation of the above-described assembly performing the steps of extending the fin 42 to create the disturbance D in the cavity boundary 32, and measuring the speed of the disturbance as the disturbance propagates along the cavity, thereby to determine the speed of the vehicle through the water. The speed is computed by an autopilot on-board the vehicle.

It will be understood that many additional changes in the details, steps and arrangement of components, which have been herein described and illustrated in order to explain the nature of the invention, may be made by those skilled in the art within the principles and scope of the invention as expressed in the appended claims.

The foregoing describes the invention in terms of embodiments foreseen by the inventor and for which an enabling description is available. Insubstantial modifications of the invention not presently foreseen may nonetheless represent equivalents.

What is claimed is:

1. An apparatus for determining the speed of a supercavitating underwater vehicle traveling underwater and having a hull and a cavitator capable of forming a cavity formation with a boundary, the apparatus comprising:
- a means for disturbing the cavity formation in order to cause a disturbance that propagates along the cavity formation boundary;
- a means for sensing said disturbance at a known distance from where the disturbance was caused; and
- a means for measuring the time difference between the time the disturbance was caused and the time the disturbance was sensed.

2. The apparatus in accordance with claim 1 wherein said means for disturbing the cavity formation comprises:
- a fin mounted on the supercavitating underwater vehicle aft of the cavitator of the supercavitating underwater vehicle, said fin adapted to extend outwardly beyond the hull of said supercavitating underwater vehicle to form a disturbance.

3. The apparatus in accordance with claim 2 wherein said means for sensing said disturbance comprises:
- at least one acoustic transmitter mounted on the supercavitating underwater vehicle for directing acoustic energy toward the boundary and the disturbance; and
- at least one acoustic receiver mounted on the supercavitating underwater vehicle at a known distance from said at least one acoustic transmitter for receiving acoustic energy reflected off of the disturbance.

4. The apparatus in accordance with claim 3 wherein said means for measuring the time difference between the time the disturbance was caused and the time the disturbance was sensed comprises:
- an autopilot mounted on the vehicle capable of reading the time of projection of said fin and the time of reception of reflected acoustic energy.

5. An assembly for determining the speed of a supercavitating underwater vehicle during underwater travel, the assembly comprising:
- a fin mounted on the supercavitating underwater vehicle aft of a cavitator portion of the supercavitating underwater vehicle and adapted to be extended outwardly beyond a hull of the supercavitating underwater vehicle and through a boundary of a gas-filled cavity around the supercavitating underwater vehicle to form a disturbance in the cavity boundary, which disturbance propagates along the boundary;
- an acoustic transmitter mounted on the supercavitating underwater vehicle for directing acoustic energy toward the boundary and the disturbance;
- an acoustic receiver mounted on the supercavitating vehicle at a known distance from the acoustic transmitter for receiving acoustic energy reflected off of the disturbance; and
- an autopilot mounted on the supercavitating underwater vehicle for recording times of projection of said fin and for recording times of receptions of reflected acoustic energy to determine the speed of the supercavitating vehicle through the water.

6. The assembly in accordance with claim 5 and further comprising an actuator mounted on the supercavitating underwater vehicle for effecting extension of said fin and for communicating such extensions to said autopilot.

7. The assembly in accordance with claim 5 and further comprising at least one additional transmitter and at least one additional receiver, all of said transmitters and receivers being in communication with said autopilot.

8. The assembly in accordance with claim 5 wherein said receiver is of an annular configuration and is disposed around said transmitter.

9. The assembly in accordance with claim 5 wherein said transmitter is covered with an acoustic lens through which the acoustic energy transmissions pass.

10. The assembly in accordance with claim 8 wherein said transmitter is covered with an acoustic lens through which the acoustic energy transmissions pass.

11. A method for determining the speed during underwater travel of a supercavitating underwater vehicle having a hull and a cavitator capable of forming a cavity formation with a boundary, the method comprising the steps of:
- disturbing the cavity formation in order to cause a disturbance that propagates along the cavity formation boundary; and
- measuring the speed of the disturbance as the disturbance propagates along the cavity boundary thereby determining the speed of the supercavitating underwater vehicle through the water.

12. The method in accordance with claim 11 wherein the step of measuring the speed of the disturbance as the disturbance propagates along the cavity boundary comprises:
- sensing said disturbance at a known distance from where the disturbance was caused; and
- measuring the time difference between the time the disturbance was caused and the time the disturbance was sensed;
- computing the speed of the disturbance past the supercavitating underwater vehicle and thereby the speed of the vehicle through the water by dividing said known distance from where the disturbance was caused by said time difference.

13. The method in accordance with claim 12 wherein the step of disturbing the cavity formation in order to cause a disturbance that propagates along the cavity formation boundary comprises:
- extending a fin mounted behind the cavitator at a forward end of the supercavitating underwater vehicle such that the fin extends through the cavity formation boundary, which disturbance propagates along the cavity boundary.

14. The method in accordance with claim 13 wherein the step of sensing said disturbance comprises:
- directing acoustic energy from the supercavitating underwater vehicle towards the cavity formation boundary and disturbance; and
- receiving acoustic energy reflected from the disturbance back to the supercavitating underwater vehicle.

15. The method in accordance with claim 14 wherein the step of measuring the time difference between the time the disturbance was caused and the time the disturbance was sensed comprises:
- recording the time of extending the fin;
- recording the time of receptions of acoustic energy reflected from the disturbance; and
- calculating the difference in time.

* * * * *